June 15, 1965   P. F. BOEYE ETAL   3,189,176
STACKING STRUCTURE FOR BATTERIES
Filed April 22, 1963
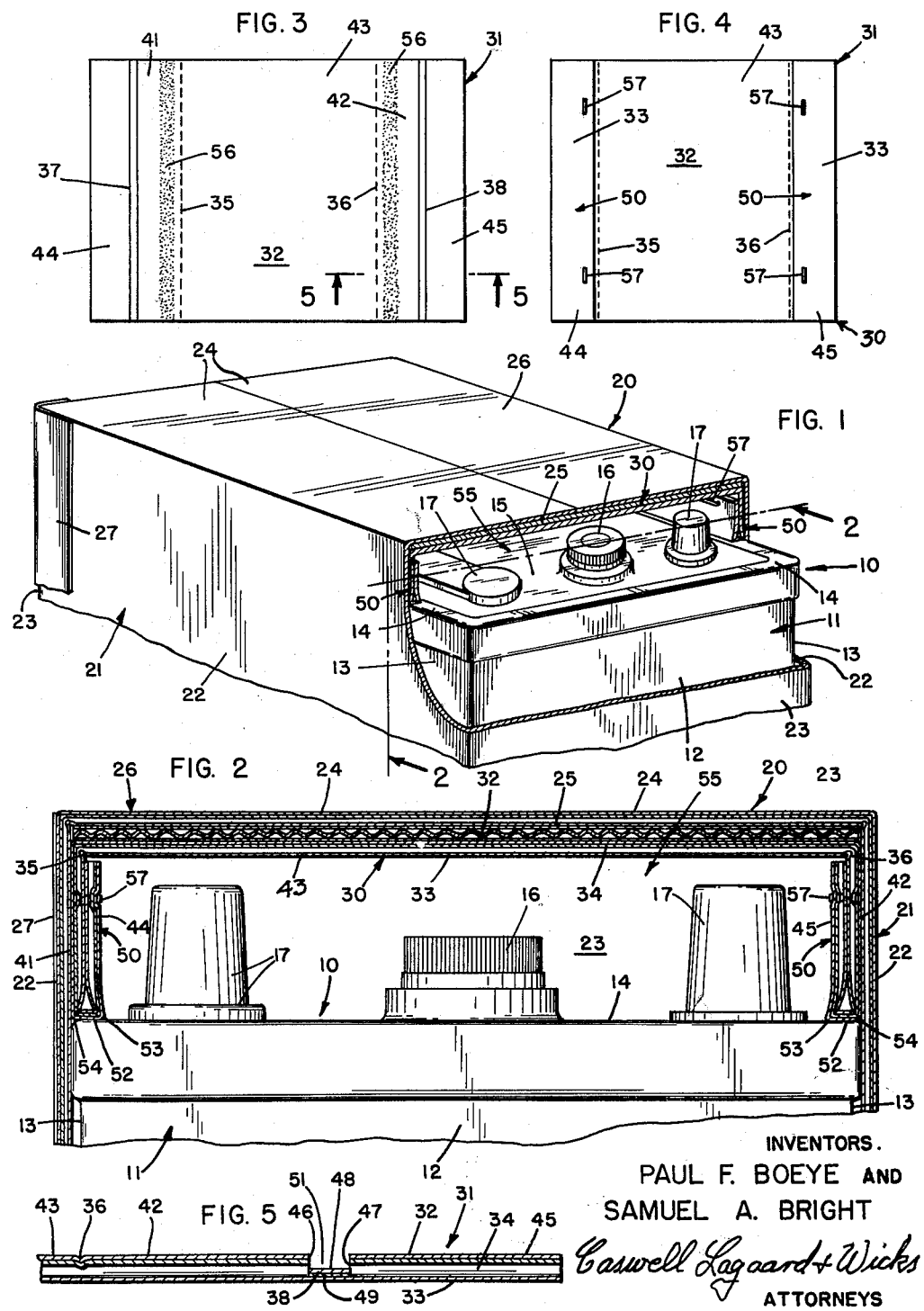
INVENTORS.
PAUL F. BOEYE AND
SAMUEL A. BRIGHT
Caswell Lagaard + Wicks
ATTORNEYS United States Patent Office 3,189,176
Patented June 15, 1965

3,189,176
STACKING STRUCTURE FOR BATTERIES
Paul F. Boeye, Mound, and Samuel A. Bright, Minneapolis, Minn., assignors to Northwestern Corrugated Box Co., Minneapolis, Minn., a corporation of Minnesota
Filed Apr. 22, 1963, Ser. No. 274,727
1 Claim. (Cl. 206—65)

The herein disclosed invention relates to stacking structures for batteries and has for an object to provide a structure having great rigidity whereby considerable weight may be borne by the structure and several batteries stacked one upon the other.

Another object of the invention resides in constructing the stacking structure with an enclosure having a top overlying and spaced from the uppermost portion of the case of the battery and a wall structure extending about the side and end walls of the case and forming a compartment for the reception of the terminals and filler caps of the battery and in further providing a separate spacer insertable into the case within said compartment engaging said top of said enclosure and the upper marginal portions of the case of the battery to support other batteries stacked on said enclosure.

A still further object of the invention resides in providing the spacer with spaced struts engaging the top of the enclosure and the upper marginal portions of the battery case.

An object of the invention resides in constructing the struts with legs and connecting means therebetween underlying said top and in further constructing said struts with reinforcing members lying adjacent said legs and rigid connections therebetween serving as bases resting upon the marginal portions of the battery case.

Another object of the invention resides in constructing the spacer from a single separate sheet of double-faced corrugated board.

A still further object of the invention resides in forming the struts by cutting one of the facings along spaced parallel lines to sever a strip therefrom and urging said strip toward the opposite facing to crush the corrugated filler between said facing and strip and in folding the board along the cuts to form a leg and a reinforcing member overlying said leg and a base therebetween with sharp corners between the base and said leg and reinforcing member.

Other objects of the invention reside in the novel combination and arrangement of parts and in the details of construction hereinafter illustrated and/or described.

In the drawings:

FIG. 1 is a perspective view of a portion of a battery with the invention applied thereto and with portions thereof cut away to illustrate the construction of the invention.

FIG. 2 is an elevational sectional view taken on line 2—2 of FIG. 1 and drawn to a greater scale.

FIG. 3 is a developed view of the blank from which the spacer embodying the instant invention is constructed.

FIG. 4 is a view similar to FIG. 3 with portions of the same folded over and secured together to form the struts of the invention.

FIG. 5 is a fragmentary cross-sectional view taken on line 5—5 of FIG. 3 and drawn to an enlarged scale.

For the purpose of illustrating the invention, a portion of a battery 10 has been shown. This battery comprises a case 11 having end walls, one of which is indicated by the reference numeral 12 and side walls 13. The case 10 is open at the top for the reception of the elements of the battery thus leaving the upper marginal portion 14 of the case exposed. A sealant 15 covers the open end of the case 11. Extending through the sealant 15 and disposed above the marginal portion 14 of the case 10 are filler caps 16 and terminals 17. The instant invention serves to protect the filler caps 16 and the terminals 17 and to permit of stacking batteries one upon the other.

The invention consists of an enclosure 20 and a spacer 30 disposed within the same. The enclosure 20 is constructed from corrugated board folded to form a wall structure 21 of ordinary construction having side walls 22 and end walls 23. The terminal side and end walls are secured together by means of a strip of adhesive tape 27. These walls fit snuggly about the side and end walls of the case 11 and project upwardly beyond the marginal portion 14 of said case. Issuing inwardly from the walls 22 and 23 are side flaps 24 and end flaps 25. These flaps when glued together form a top wall for the enclosure indicated in its entirety by the reference numeral 26. The lower end of the wall structure 21 is open so that the enclosure when erected may be slipped over the battery.

The spacer 30 is constructed from a blank 31 of double-faced corrugated board having facings 32 and 33 with a corrugated body 34 therebetween. The blank 31 is of a width equal to the distance between the end walls 23 of the wall structure 21 and of a length sufficient to form the various parts of the spacer. The corrugations of the body run lengthwise of the blank. The blank 31 is formed with two transverse scores 35 and 36. Parallel with the scores 35 and 36 the blank 31 is formed with spaced deformations 37 and 38. When the blank is properly folded along the scores 35 and 36 and the deformations 37 and 38 two legs 41 and 42 are formed with a connecting portoin 43 therebetween. In addition, two reinforcing members 44 and 45 are formed by the deformations 37 and 38 which are adapted to lie adjacent to and be secured to the legs 41 and 42.

The manner of forming the deformations 37 and 38 constitute a principal feature of the invention. Since the deformations are identical only the deformation 38 will be described which is shown in detail in FIGS. 2 and 5. The deformation 38 is formed by making two spaced cuts 46 and 47 in the board crosswise of the corrugations of a width substantially equal to or greater than twice the thickness of the corrugated board. These cuts extend through the facing 32 and through the portions of the corrugated body 34 outwardly of the portions of the corrugations of said body adhered to the facing 33. This forms a strip 48 of the facing 32 together with an intermediate portion 49 of the body 34 severed from said facing and body. The strip 48 is pressed toward the intermediate portion 49 of the body 34 and toward the facing 33 to compress and flatten the said intermediate portion. This forms a groove 51 between the cuts 46 and 47. In folding the blank along the deformation 38, the facing 33 folds at the localities of the cuts 46 and 47 to form a base 52 having sharp corners 53 and 54. The base 52 is adapted to rest upon the marginal portion 14 of the case 11 of the battery and which is capable of resisting appreciable stress caused by the stacking of other batteries upon the stacking structure.

The method of using the invention is as follows: Reinforcing members 44 and 45 are secured to the legs 41 and 42 by means of adhesive 56 to form a composite strut indicated in its entirety by the reference numeral 50 as shown in FIGS. 1, 2 and 4. Staples 57 may also be used for the purpose. The blank 31 so formed remains flat until desired for use as shown in detail in FIG. 4. The enclosure 20 is constructed in the customary manner with the wall structure of the same collapsed and the flaps 23 and 24 extending outwardly therefrom. When desired for use, the enclosure is erected in the customary manner and the various flaps secured together. The struts 50 are next folded at right angles to the connecting portion 43 about the scores 35 and 36. The assembled spacer 30 may then be inserted into the enclosure 20 and in which the struts 50 lie along the walls 22 of the enclosure. With the parts so arranged the assembled stacking structure may be slipped over the top of the battery and when the bases 52 rest upon the marginal portion 14 of the battery a compartment 55 is formed and in which the terminals 17 and caps 16 are disposed. Other batteries similarly constructed or other heavy articles may now be stacked one upon the other and resting on the spacer 30.

The advantages of the invention are manifest. With ordinary scores round corners are formed in the struts and which cause the struts to occasionally slide in between the lateral walls of the enclosure and the battery and thus fail to carry the load placed upon the same. With the instant invention, the sharp corners formed between the base 55 and the legs and reinforcing members of the stacking structure form a flat surface on the base which maintains the struts in proper position upon the battery and which results in transmitting greater load than would otherwise be possible. The improved stacking structure can be built without additional expense excepting for the formation of the deformations in the spacer. The parts of the stacking structure are foldable in a flat form so as to economize in space in the storage and shipment of the same. Applicant has found by actual tests that a stacking structure formed in the manner of the instant invention will support considerably greater loads than when formed with spaced parallel scores of ordinary construction.

Changes in the specific form of the invention, as herein described, may be made within the scope of what is claimed without departing from the spirit of the invention.

Having described the invention, what is claimed as new and desired to be protected by Letters Patent is:

A strut adapted to be used in a battery stacking structure constructed from a sheet of corrugated board having spaced facings with a corrugated body therebetween, spaced parallel cuts extending across the corrugations of the board and through one of said facings and into the corrugated body to sever a strip of the cut facing and the portion of the body adhering thereto between said cuts from said facing and body, said uncut facing being folded at the locality of said cuts to form said strut with a leg and a reinforcing member from the portion of the board disposed outwardly of said cuts and a base therebetween, said leg and reinforcing member overlying one another, said severed strip of said cut facing and said severed portion of said body throughout the width thereof being pressed against said base, and means for securing said leg and reinforcing member together.

References Cited by the Examiner
UNITED STATES PATENTS

| | | | |
|---|---|---|---|
| 1,965,215 | 7/34 | Boeye | 206—46 |
| 2,099,936 | 11/37 | Kieckhefer. | |
| 2,674,369 | 4/54 | Gilks | 206—46 |
| 2,761,553 | 9/56 | Wheeler | 206—46 |
| 2,885,073 | 5/59 | Bettoli et al. | 206—60 |
| 3,056,536 | 10/62 | Smith et al. | 206—46 |

THERON E. CONDON, *Primary Examiner.*

GEORGE O. RALSTON, *Examiner.*